United States Patent
Kim et al.

(10) Patent No.: US 8,343,385 B2
(45) Date of Patent: Jan. 1, 2013

(54) CONDUCTIVE PASTE COMPOSITION AND METHOD FOR PRODUCING MULTILAYER CERAMIC CAPACITOR USING THE SAME

(75) Inventors: Jong Han Kim, Gyeonggi-do (KR); Hyun Chul Jeong, Gyeonggi-do (KR); Sung Bum Sohn, Gyeonggi-do (KR); Jai Joon Lee, Gyeonggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 39 days.

(21) Appl. No.: 13/026,685

(22) Filed: Feb. 14, 2011

(65) Prior Publication Data

US 2012/0110807 A1    May 10, 2012

(30) Foreign Application Priority Data

Nov. 8, 2010 (KR) .................. 10-2010-0110366

(51) Int. Cl.
*H01B 1/22* (2006.01)
(52) U.S. Cl. ....................................... 252/513
(58) Field of Classification Search .......... 252/512–514
See application file for complete search history.

(56) References Cited

U.S. PATENT DOCUMENTS

| | | | | |
|---|---|---|---|---|
| 4,496,875 | A * | 1/1985 | Barth et al. | 313/632 |
| 7,083,744 | B2 * | 8/2006 | Matsuno et al. | 252/512 |
| 7,851,393 | B2 * | 12/2010 | Sohn et al. | 501/65 |
| 8,231,934 | B2 * | 7/2012 | Takeda et al. | 427/123 |

FOREIGN PATENT DOCUMENTS

KR    10-0632001 B1    9/2006

\* cited by examiner

*Primary Examiner* — Mark Kopec
(74) *Attorney, Agent, or Firm* — McDermott Will & Emery LLP

(57) ABSTRACT

Disclosed herein is a conductive paste composition. The conductive paste composition according to the exemplary embodiment of the present invention includes a conductive powder including nickel or a nickel alloy; a spherical particulate inhibitor including $BaTiO_3$ powders; and a glass composition having Chemical Formula of $aLi_2O\text{-}bK_2O\text{-}cCaO\text{-}dBaO\text{-}eB_2O_3\text{-}fSiO_2$, wherein a, b, c, d, e, and f satisfy $a+b+c+d+e+f=100$, $2\leq a\leq 10$, $2\leq b\leq 10$, $0\leq c\leq 25$, $0\leq d\leq 25$, $5\leq e\leq 20$, and $50\leq f\leq 80$.

7 Claims, 3 Drawing Sheets

CONDUCTIVE PASTE COMPOSITION AND METHOD FOR PRODUCING MULTILAYER CERAMIC CAPACITOR USING THE SAME

CROSS REFERENCE(S) TO RELATED APPLICATIONS

This application claims the benefit under 35 U.S.C. Section [120, 119, 119(e)] of Korean Patent Application Serial No. 10-2010-0110366, entitled "Conductive Paste Composition And Method For Producing Multilayer Ceramic Capacitor Using The Same" filed on Nov. 8, 2010, which is hereby incorporated by reference in its entirety into this application.

BACKGROUND OF THE INVENTION

1. Technical Field

The present invention relates to a conductive paste composition and a method for producing a multilayer ceramic capacitor using the same, and more particularly, to a conductive paste composition including a glass composition having specific compositions in a conductive paste for an inner electrode to increase firing shrinkage starting temperature and discharging an inhibitor to a dielectric layer during a firing process to improve dielectric characteristics while being fired together with a dielectric, and a method for producing a multilayer ceramic capacitor using the same.

2. Description of the Related Art

As a demand for small, light, and multi-functional electric and electronic products is rapidly increased, a demand for a small and high-capacity multilayer ceramic capacitor used therefor is also increased accordingly. Therefore, a dielectric layer and an inner electrode layer used for the multilayer ceramic capacitor are gradually thin and highly stacked.

In order to manufacture the multilayer ceramic capacitor including an ultra-thin dielectric layer, a dielectric composition that can be sintered at low temperature should be used. The connection of the inner electrode is a very important factor in implementing the capacitance of the multilayer ceramic capacitor. Generally, a nickel electrode layer used as the inner electrode is sintered at a lower temperature by several hundred ° C. than a sintering temperature of a dielectric, such that the sintering shrinkage discordance between the dielectric layer and the inner electrode occurs when the firing temperature is too high and the aggregation phenomenon of the inner electrode is serious to lower the capacitance of the ceramic capacitor and to increase a short ratio. Therefore, in order to prevent the phenomenon, it is preferable to sinter the nickel inner electrode and the dielectric layer at a low temperature of 1100° C. under the reducing atmosphere.

Instead of using BaO—CaO—$SiO_2$-based glass frit or $BaSiO_3$-based mixing powders that are used as a sintering aid for producing a multilayer ceramic capacitor according to the related art while accelerating the low-temperature firing, a method for performing low-temperature firing, or the like, by newly preparing a glass composition for low-temperature firing and adding it to a dielectric has been actively researched and developed. Since the sintering aid using the BaO—CaO—$SiO_2$-based glass frit or $BaSiO_3$-based mixing powders has a high melting point of 1200° C., it is difficult to promote the sintering at a low temperature of 1150° C. or less and a liquid-phase formation is rapidly performed at high temperature, thereby causing a problem in that the sintering temperature range for producing the multilayer ceramic capacitor is very limited.

Therefore, in the method for producing a multilayer ceramic capacitor in order to secure the excellent electrode connection and the dielectric characteristics, the low-temperature firing is inevitable. Generally, the low-temperature characteristics are implemented by adding the glass composition for low-temperature firing to the dielectric layer but a technology of improving the dielectric characteristics during the firing process by introducing the glass composition for low-temperature firing into the conductive paste composition for the inner electrode has not yet been implemented until now.

SUMMARY OF THE INVENTION

An object of the present invention is to provide a conductive paste composition for an inner electrode capable of securing excellent electrode connection and dielectric characteristics and a multilayer ceramic capacitor using the same.

According to an exemplary embodiment of the present invention, there is provided a paste composition for an inner electrode for a multilayer ceramic capacitor, including: a conductive powder including nickel or a nickel alloy; a spherical particulate inhibitor including $BaTiO_3$ powders; and a glass composition having Chemical Formula of $aLi_2O$-$bK_2O$-$cCaO$-$dBaO$-$eB_2O_3$-$fSiO_2$, wherein a, b, c, d, e, and f satisfy a+b+c+d+e+f=100, $2 \leq a \leq 10$, $2 \leq b \leq 10$, $0 \leq c \leq 25$, $0 \leq d \leq 25$, $5 \leq e \leq 20$, and $50 \leq f \leq 80$.

The average grain size of the conductive power including nickel or a nickel alloy may be 50 to 150 nm, the content of the particulate inhibitor may be 3 to 25 wt % for the conductive powder, and the glass composition including nickel or a nickel alloy may be 1 to 3 wt % for the $BaTiO_3$ powders.

The paste composition for an inner electrode for a multilayer ceramic capacitor may further include at least one rare earth element selected from a group consisting of Y, Dy, Ho, and Yb and Mg as additives.

The glass composition may be spherical particulate powders having an average grain size of 300 nm or less.

The softening point of the glass composition may be 750 to 760° C.

The melting point of the glass composition may be 950° C. or more.

The average grain size of the $BaTiO_3$ powders may be equal to or less than that of the conductive particle and may be ⅙ to ½ as compared to the conductive particle.

According to another exemplary embodiment of the present invention, there is provided a method for producing a multilayer ceramic capacitor, including: preparing a paste composition for an inner electrode for a multilayer ceramic capacitor including a glass composition having Chemical Formula of $aLi_2O$-$bK_2O$-$cCaO$-$dBaO$-$eB_2O_3$-$fSiO_2$ (where a, b, c, d, e, and f satisfy a+b+c+d+e+f=100, $2 \leq a \leq 10$, $2 \leq b \leq 10$, $0 \leq c \leq 25$, $0 \leq d \leq 25$, $5 \leq e \leq 20$, and $50 \leq f \leq 80$); forming the inner electrode by printing the paste composition for the inner electrode on a dielectric layer; and stacking and firing the dielectric layer printed with the inner electrode, wherein the firing includes densifying the dielectric layer by sintering the glass composition together with the dielectric layer while discharging the glass composition to the dielectric layer.

The paste composition for an inner electrode for a multilayer ceramic capacitor may further include at least one rare earth element selected from a group consisting of Y, Dy, Ho, and Yb and Mg as additives The average grain size of the glass composition may include spherical particulate powders be controlled to be 300 nm or less.

The softening point of the glass composition may be 750 to 760° C.

The melting point of the glass composition may be 950° C. or more.

DESCRIPTION OF THE PREFERRED EMBODIMENTS

Figure 1:
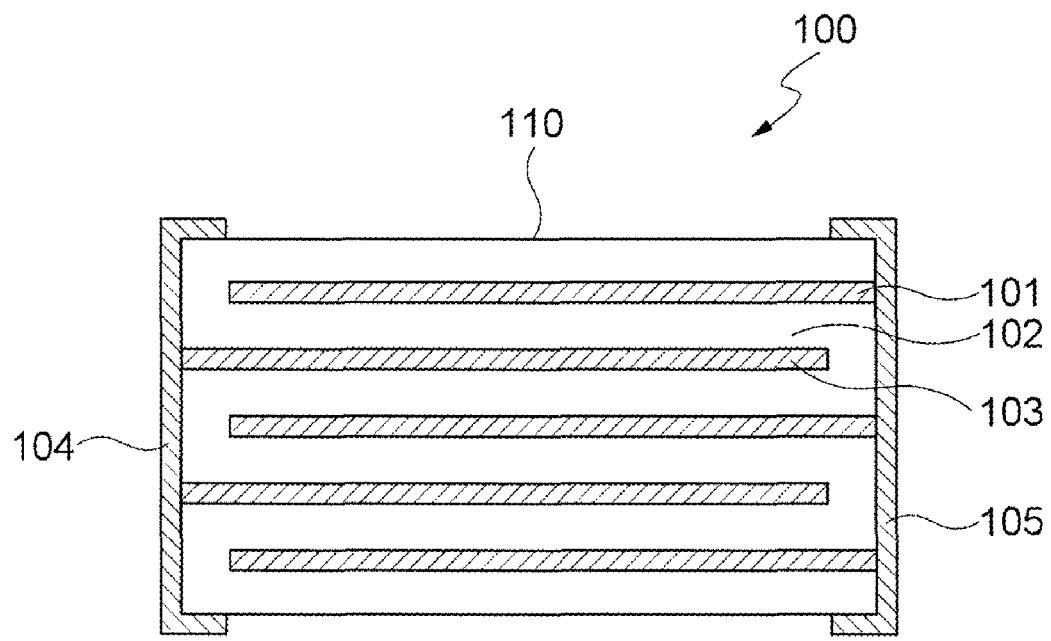
FIG. 1 is a cross-sectional view of a multilayer ceramic capacitor according to an embodiment of the present invention.

Advantages and characteristics of the present invention, and a method for achieving them will be apparent with reference to embodiments described below in addition to the accompanying drawings. However, the present invention is not limited to the embodiments disclosed below, but may be implemented in various forms. The embodiments may be provided to completely disclose the present invention and allow those skilled in the art to completely know the scope of the present invention. Throughout the specification, like elements refer to like reference numerals.

Terms used in the specification are used to explain the embodiments and not to limit the present invention. In the specification, a singular type may also be used as a plural type unless stated specifically. "Comprises" and/or "comprising" used the specification mentioned constituent members, steps, operations and/or elements do not exclude the existence or addition of one or more other components, steps, operations and/or elements.

Hereinafter, a conductive paste composition and a multilayer ceramic capacitor using the same according to the present invention will be described in detail with reference to the accompanying drawings.

<Paste Composition for Inner Electrode>

A paste composition for an inner electrode according to the present invention includes a conductive powder including nickel or a nickel alloy, a spherical particulate inhibitor including $BaTiO_3$ powders, and a glass composition having Chemical Formula of $aLi_2O\text{-}bK_2O\text{-}cCaO\text{-}dBaO\text{-}eB_2O_3\text{-}fSiO_2$, where a, b, c, d, e, and f satisfy a+b+c+d+e+f=100, $2 \leq a \leq 10$, $2 \leq b \leq 10$, $0 \leq c \leq 25$, $0 \leq d \leq 25$, $5 \leq e \leq 20$, $50 \leq f \leq 80$.

Although the conductive powder material included in the paste composition for the inner electrode is not specifically limited, a dielectric layer has reduction resistance, such that it is preferable to use nickel or a nickel alloy as an inner electrode material. In this case, an average grain size of the conductive powder including nickel or the nickel alloy is 50 to 150 nm, which may be advantageous in characteristic implementation.

The spherical particulate inhibitor included in the paste composition for the inner electrode may include the $BaTiO_3$ powder that is a main component of the dielectric layer. It may be preferable that the content of the inhibitor including the $BaTiO_3$ powders may be 3 to 25 wt % for the conductive powder including nickel or a nickel alloy.

The glass composition included in the paste composition for the inner electrode according to the present invention may include at least any one of lithium oxide ($Li_2O$), potassium oxide ($K_2O$), calcium oxide (CaO), barium oxide (BaO), boron oxide ($B_2O_3$), and silicon oxide ($SiO_2$).

The $SiO_2$ content in the glass composition may be 50 to 80 mol % based on a total number of 100 moles of $Li_2O$, $K_2O$, CaO, BaO, $B_2O_3$, and $SiO_2$. The content of $SiO_2$ may preferably be 55 to 75 mol %, more preferably, 60 to 75 mol %. The $SiO_2$ may have a structure in which a silicon atom is coupled with four adjacent silicon atoms while four oxygen atoms surrounding the silicon atom is interposed between the silicon atom and the four adjacent silicon atoms. The $SiO_2$, which is a glass network-former, serves as the most important factor of determining high-temperature flowability and melting point of the glass and solubility for the $BaTiO_3$. When the content of $SiO_2$ within the glass composition is below 50 mol %, the solubility for the $BaTiO_3$ is degraded, such that the low-temperature sinterability cannot be improved. When the content of $SiO_2$ exceeds 80 mol %, the high-temperature flowability is degraded and the liquid-phase formation temperature is increased, such that the glass composition may be inappropriate as the sintering aid for low-temperature sintering of 1100° C. or less.

The content of $B_2O_3$ within the glass composition is 5 to 20 mol %. The $B_2O_3$ serves as the glass network-former together with the $SiO_2$ and may determine the solubility for $BaTiO_3$. Further, the $Ba2O_3$ which is a fluxing agent, can greatly lower the melting point of glass and greatly improve the high-temperature flowability. In particular, it may be preferable that the content of 5 mol % or more of $B_2O_3$ is added to the glass composition in order to improve the high-temperature flowability. When the content of $B_2O_3$ exceeds 20 mol %, the chemical durability may be degraded due to the structural weakness of glass and the glass formation capability may be degraded due to crystallization.

The content of $Li_2O$ within the glass composition is 2 to 10 mol %. The $Li_2O$ may be a glass network-modifier. The $Li_2O$ disconnects the glass network structure composed of $SiO_2$ or $B_2O_3$, thereby making it possible to lower the melting point of glass and improve the high-temperature flowability. When the content of $Li_2O$ is below 2 mol %, the high-temperature flowability of glass may be degraded and the liquid formation temperature may be excessively increased. When the content of $Li_2O$ exceeds 10 mol %, it may be difficult to form glass due to the structural weakness and crystallization of glass.

The content of $K_2O$ within the glass composition may be 2 to 10 mol %. The $K_2O$ may be the glass network-modifier, similar to the $Li_2O$. The $K_2O$ disconnects the glass network structure composed of $SiO_2$ or $B_2O_3$, thereby making it possible to lower the melting point of glass and improve the high-temperature flowability. In particular, when $K_2O$ is simultaneously injected with other alkali oxide such as $Li_2O$, etc., it induces a chemically complementary effect (mixing alkali effect), thereby making it possible to increase the chemical durability and reduce the dielectric loss of the dielectric. When the content of $K_2O$ is 2 to 10 mol %, the glass has appropriate high-temperature flowability and can obtain the appropriate complementary effect with the $Li_2O$.

The content of CaO and BaO within the glass composition may be 25 mol % or less. The CaO, which is the glass network-modifier, lowers the melting point of glass and reinforces the glass structure weakened by the alkali metal oxide, thereby making it possible to improve the chemical durability. However, the CaO suddenly lowers the high-temperature viscosity of glass, thereby making it possible to lead to the sudden sintering shrinkage of ceramic. The BaO may largest lower the melting point of glass in alkali earth oxide. In particular, the BaO smooth the change in high-temperature viscosity of glass, thereby making it possible to prevent the sudden sintering shrinkage of ceramic. In addition, the CaO and BaO serve to stabilize the capacitance temperature characteristics of $BaTiO_3$ powders but when they are excessively added, the sinterability may be degraded. When the content of at least any one of the CaO and the BaO exceeds 25 mol %, the glass formation capability is degraded as well as the low-temperature sinterability of the $BaTiO_3$ powders may be degraded.

The glass composition may be 1 to 3 wt % for the $BaTiO_3$ powders. When the glass composition is out of the range, the electrode connection may be poor.

The paste composition for the inner electrode for the multilayer ceramic capacitor of the present invention may further include rare earth elements and Mg of at least one of Y, Dy, Ho, and Yb. The rare earth element and Mg may be added in an oxide or carbonate form.

In this case, the glass composition may include the spherical particulate powders having a grain size of 300 nm or less. When the grain size of the glass composition exceeds 300 nm, it may be difficult to uniformly sinter the glass composition. In addition, when the shape of the glass composition is a needle shape or an aggregated shape, there may be a risk of causing the uniform sintering. As a result, the shape of the glass composition may be preferably a spherical shape.

The softening point of the glass composition is 750 to 760° C. and the melting point thereof is 950° C. or more, which may be advantageous in the dielectric characteristic implementation.

In addition, the average grain size of the $BaTiO_3$ powders, which is equal to or less than the average grain size of the conductive particle, is approximately ⅙ to ½ as compared to that of the conductive particle, which may be advantageous in the dielectric characteristic implementation.

The conductive paste composition for the inner electrode of the present invention, which is a conductive material, is produced by a typical method that mixes a glass frit obtained by performing dry grinding on a glass plate obtained by estimating component powders (powders of $Li_2O$, $K_2O$, $CaO$, $BaO$, $B_2O_3$, and $SiO_2$) in order to satisfy 50 to 70 wt % of conductive powder including nickel or a nickel alloy, 3 to 25 wt % of $BaTiO_3$ powder, which is the spherical particulate inhibitor, for nickel or a nickel alloy, and the compositions of the above-mentioned glass composition, sufficiently mixing them, melting them at 1400 to 1500° C., and rapidly cooling them and mixes 1 to 3 wt % of the glass frit for $BaTiO_3$, which is the inhibitor.

<Multilayer Ceramic Capacitor>

FIG. 1 is a cross-sectional view of a multilayer ceramic capacitor according to an embodiment of the present invention. Referring to FIG. 1, a multilayer ceramic capacitor 100 has a capacitor body 110 in which a dielectric layer 102 and inner electrode layers 101 and 103 are alternately stacked. External electrodes 104 and 105 are formed at the outer surface of the capacitor body 110 and may each be electrically connected to the corresponding inner electrodes 103 and 101.

The dielectric layer 102 and the inner electrodes 101 and 103 may include the above-mentioned glass composition of the present invention. For example, the dielectric layer 102 includes $BaTiO_3$ that is a main component and a sub-component containing the above-mentioned glass composition, wherein the sub-component includes 1.0 to 3.0 mol of the glass composition, 0.5 to 2.0 mol of the $MgCO_3$, 0.3 to 1.0 mol of the rare earth oxide, and 0.05 to 1.0 mol of the MnO for 100 mol of the main component.

Further, the inner electrodes 101 and 103 may be made of the conductive paste composition containing the above-mentioned glass composition of the present invention. For example, the glass frit was obtained by performing dry grinding on a glass plate obtained by estimating component powders (powders of $Li_2O$, $K_2O$, $CaO$, $BaO$, $B_2O_3$, and $SiO_2$) in order to satisfy 50 to 70 wt % of conductive powder including nickel or a nickel alloy, 3 to 25 wt % of $BaTiO_3$, which is the spherical particulate inhibitor, for nickel or a nickel alloy, and the compositions of the above-mentioned glass composition, sufficiently mixing them, melting them at 1400 to 1500° C., and rapidly cooling them and the glass frit may be controlled to be 1 to 3 wt % for the $BaTiO_3$ powders, which is the inhibitor.

The thickness of the dielectric layer 102 is not specifically limited, but may be controlled to be 3 μm or less per approximately 1 layer in order to implement the ultra-thin high-capacity capacitor. Preferably, the dielectric layer 102 may have a thickness of 1 to 3 μm.

The conductive material included in the inner electrodes 101 and 103 is not specifically limited. For the above reason, it may be preferable to use the nickel or the nickel alloy.

As the material for the external electrodes 104 and 105, copper or nickel may be used.

Similar to the multilayer ceramic capacitor of the related art, the multilayer ceramic capacitor 100 may be produced by processes of producing slurry, molding a green sheet, printing, stacking, compressing, sintering, or the like, of the inner electrode.

Figure 2:
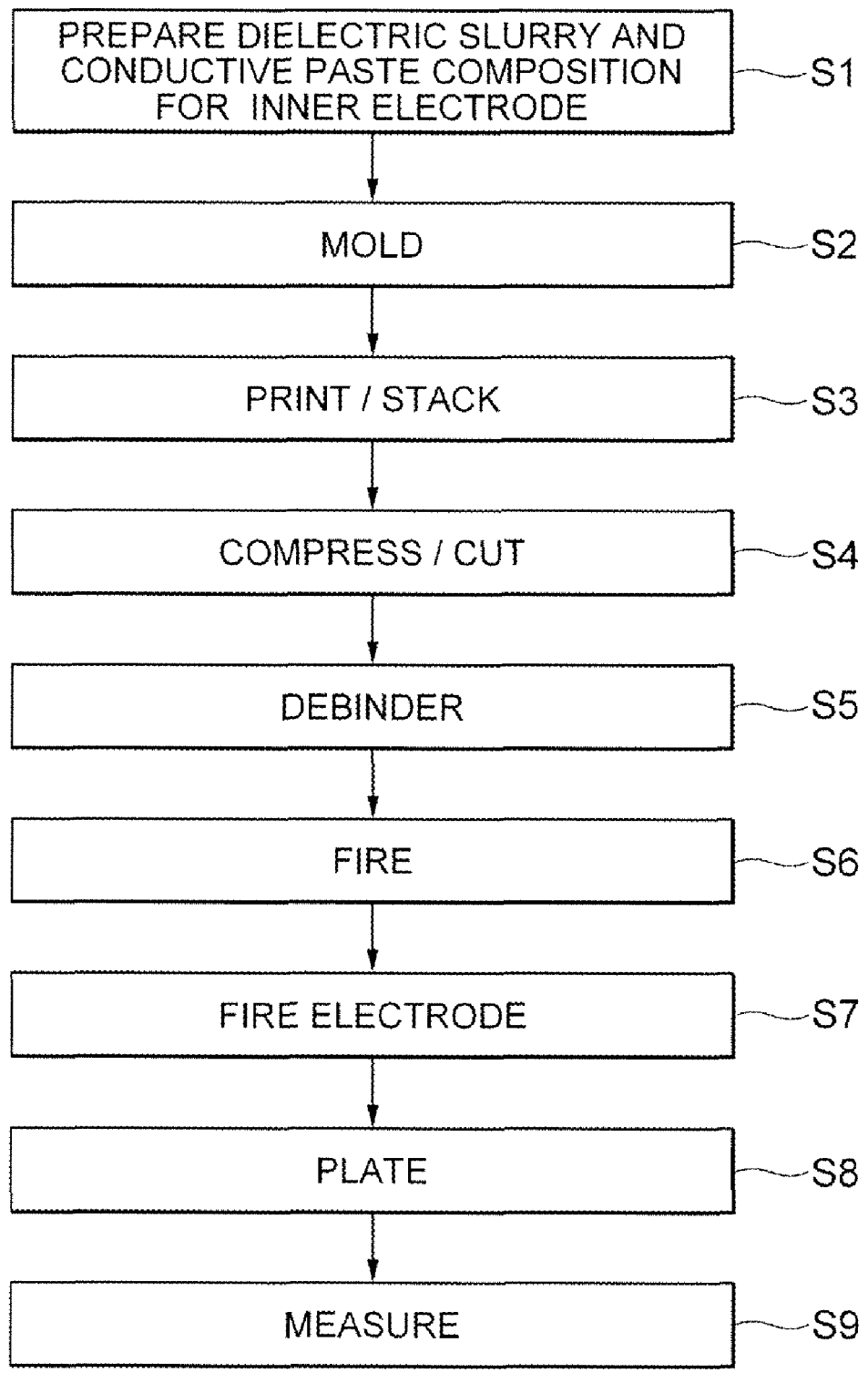
FIG. 2 is a process flow chart showing a method for producing a multilayer ceramic capacitor according to the exemplary embodiment of the present invention.

Hereinafter, referring to FIG. 2, a process of producing a multilayer ceramic capacitor according to an exemplary embodiment of the present invention will be described in detail.

The dielectric slurry including the above-mentioned glass composition and the conductive paste composition for the inner electrode of the present invention may be prepared (S1).

The slurry may be molded in a sheet (green sheet) shape (S2). For example, the slurry may be molded in a green sheet having a thickness of 3 μm or less.

The inner electrode such as nickel is printed on the green sheet and a plurality of green sheets printed with the inner electrode may be stacked (S3).

The laminate is compressed and may be cut into a separate chip (green chip) (S4).

The green chip is heated at the temperature of 250 to 350° C., thereby making it possible to remove the binder or dispersant in the chip (S5).

The de-binder treated laminate may be sintered (firing) at the temperature of approximately 1150° C. or less (S6). In this case, when firing temperature exceeds 1150° C. at the time of firing, the delamination between the dielectric layer and the inner electrode may occur and the inner electrode may be agglomerated. This is a direct factor of the short occurrence of the inner electrode, thereby making it possible to degrade the reliability. Therefore, in the present invention, it may be preferable that the firing temperature is limited to 1150° C. or less.

Figure 3:
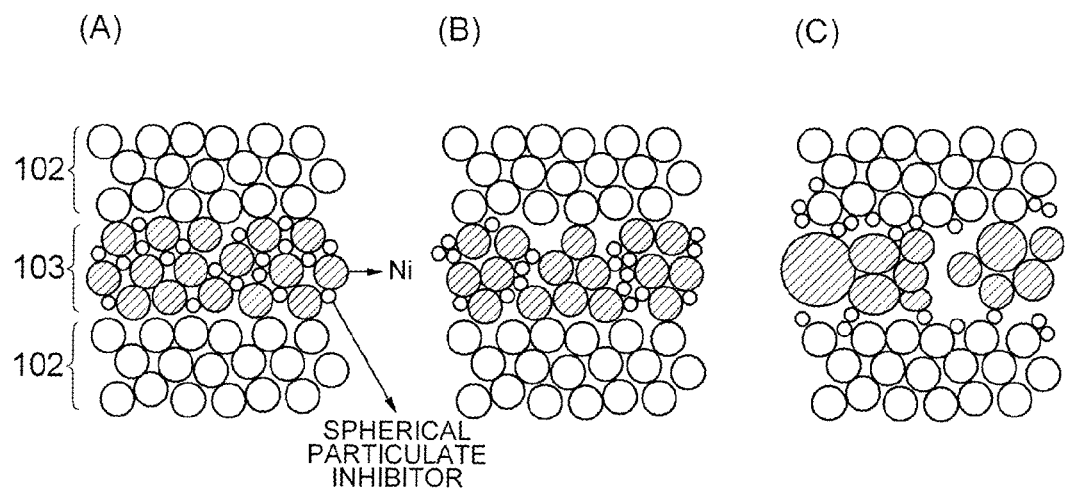
FIG. 3 is a diagram showing a sintering process according to elevated temperature during a firing process of processes for producing a multilayer ceramic capacitor according to the present invention.

FIG. 3 is a diagram showing the change in the inner electrode and the dielectric layer when the temperature is raised during the firing process among the processes of producing the multilayer ceramic capacitor including the conductive paste composition for the inner electrode of the present invention. The principle of improving the dielectric characteristics when the inhibitor including the glass composition is sintered together with the dielectric layer while being discharged to the dielectric layer during the firing process can be apparently appreciated from FIG. 3.

First, it can be appreciated that the inhibitor performs a original role to suppress the shrinkage starting of nickel that is a conductive material at (A) 700° C. or less.

Next, it can be appreciated that the shrinkage of nickel starts at (B) 700 to 900° C. to aggregate the same components.

Next, the inhibitor is leaked from the inner electrode layer and then moves to the dielectric layer at (C) 900° C. or more. In this case, the reaction with the inhibitor is preformed while the sintering of the dielectric starts, such that the composition of the inhibitor has an effect on the dielectric characteristics. As a result, the multilayer ceramic capacitor of the present invention can secure the excellent dielectric characteristics.

When the firing completes, the paste for the external electrode such as copper or nickel, or the like is applied to the outer surface of the sintered body and the paste is fired, thereby making it possible to form the external electrode (S7). Optionally, a coating layer may be formed on the surface of the external electrode by plating (S8).

Through the above-mentioned process, the multilayer ceramic capacitor 100 is obtained as shown in FIG. 1.

Thereafter, various physical properties of the multilayer ceramic capacitor are measured, thereby making it possible to evaluate the characteristics of the capacitor (S9).

Example

In order to produce the glass composition having Chemical Formula of $aLi_2O$-$bK_2O$-$cCaO$-$dBaO$-$eB_2O_3$-$fSiO_2$ (a, b, c, d, e, and f satisfy a+b+c+d+e+f=100, $2 \leq a \leq 10$, $2 \leq b \leq 10$, $0 \leq c \leq 25$, $0 \leq d \leq 25$, $5 \leq e \leq 20$, $50 \leq f \leq 80$), each element was estimated to satisfy the compositions of 7 mol % of $Li_2O$, 3 mol % of $K_2O$, 10 mol % of CaO, 10 mol % of BaO, 5 mol % of $B_2O_3$, and 65 mol % of $SiO_2$, sufficiently mixed, melted at 1400° C., rapidly cooled passing through a twin roller to obtain the glass plate, perform the dry grinding on the glass plate, and perform the vapor heat treatment thereon, thereby producing the glass composition of the ultra-fine spherical powder shape having a grain size of 100 to 300 nm.

The produced glass composition was mixed with nickel and $BaTiO_3$ inhibitor as compositions listed in Table 1 to produce the conductive paste for the inner electrode and then, printed on the dielectric layer. Further, each dielectric sheet printed with the inner electrode was stacked to form 10 layers and the laminate was then subjected to a cold isolatic press at a pressure of 1000 kg/cm³ at 85° C. for 15 minutes and cut, thereby producing a specimen.

The organic binder, the dispersant, or the like were incinerated by performing the heat treatment on the specimens at 250 to 350° C. for 40 hours or more and were sintered at various temperatures such as 1000 to 1150° C. by using an incinerator whose temperature and atmosphere can be controlled.

The sintered specimens were applied with the copper external electrode to perform the electrode firing in the range of 850 to 920° C. and after the electrode firing was completed, the plating process was performed, thereby completing the producing of the specimens. The results were shown in Table 1 obtained by measuring the electrode connection by the produced specimens after a predetermined time passes.

TABLE 1

| Sample No. | Nickel Content (Wt %) | Inhibitor $BaTiO_3$ (Wt %/Ni) | Glass Composition (Wt %/BT) | Firing Temperature (° C.) | Electrode Connection (%) |
|---|---|---|---|---|---|
| Example 1 | 50 | 3.0 | 1.0 | 1000 | ○ |
| Example 2 | 50 | 3.0 | 1.0 | 1100 | ○ |
| Example 3 | 50 | 3.0 | 3.0 | 1100 | ○ |
| Example 4 | 50 | 5.0 | 1.0 | 1000 | ○ |
| Example 5 | 50 | 5.0 | 1.0 | 1100 | ◎ |
| Example 6 | 50 | 5.0 | 1.0 | 1150 | ◎ |
| Example 7 | 50 | 5.0 | 2.0 | 1000 | ◎ |
| Example 8 | 50 | 5.0 | 2.0 | 1150 | ◎ |
| Example 9 | 50 | 5.0 | 3.0 | 1150 | ○ |
| Example 10 | 50 | 10.0 | 1.0 | 1000 | ◎ |
| Example 11 | 50 | 10.0 | 1.0 | 1100 | ◎ |
| Example 12 | 50 | 10.0 | 2.0 | 1000 | ◎ |
| Example 13 | 50 | 10.0 | 2.0 | 1150 | ○ |
| Example 14 | 50 | 10.0 | 3.0 | 1150 | ○ |
| Example 15 | 50 | 20.0 | 1.0 | 1000 | ○ |
| Example 16 | 50 | 20.0 | 1.0 | 1100 | ○ |
| Example 17 | 50 | 20.0 | 2.0 | 1000 | ◎ |
| Example 18 | 50 | 20.0 | 2.0 | 1150 | ◎ |
| Example 19 | 50 | 20.0 | 3.0 | 1150 | ○ |

(○: Good(75~85%), ◎: Very Good(85% or more))

It can be appreciated from Table 1 that in the multilayer ceramic capacitor using the conductive paste composition for the inner electrode according to the present invention, the inner electrode having very excellent electrode connection can be implemented when the low-temperature firing is performed without degrading the electrical characteristics of the dielectric for low-temperature firing.

As set forth above, the present invention increase the firing shrinkage starting temperature of the inner electrode and sinters the inhibitor together with the dielectric layer while the inhibitor is discharged to the dielectric layer during the firing process, such that the produced multilayer ceramic capacitor can secure the excellent electrode connection and dielectric characteristics, when using the conductive paste composition for the inner electrode.

The above detailed description exemplifies the present invention. Further, the above contents just illustrate and describe preferred embodiments of the present invention and the present invention can be used under various combinations, changes, and environments. That is, it will be appreciated by those skilled in the art that substitutions, modifications and changes may be made in these embodiments without departing from the principles and spirit of the general inventive concept, the scope of which is defined in the appended claims and their equivalents. Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Therefore, the detailed description of the present invention does not intend to limit the present invention to the disclosed embodiments. Further, it should be appreciated that the appended claims include even another embodiment.

What is claimed is:

1. A paste composition for an inner electrode for a multilayer ceramic capacitor, comprising:
   a conductive powder including nickel or a nickel alloy;
   a spherical particulate inhibitor including $BaTiO_3$ powders; and
   a glass composition having Chemical Formula of $aLi_2O$-$bK_2O$-$cCaO$-$dBaO$-$eB_2O_3$-$fSiO_2$,
   wherein a, b, c, d, e, and f satisfy a+b+c+d+e+f=100, $2 \leq a \leq 10$, $2 \leq b \leq 10$, $0 \leq c \leq 25$, $0 \leq d \leq 25$, $5 \leq e \leq 20$, and $50 \leq f \leq 80$.

2. The paste composition for an inner electrode for a multilayer ceramic capacitor according to claim 1, wherein the average grain size of the conductive power is 50 to 150 nm,
the content of the particulate inhibitor is 3 to 25 wt % for the conductive powder, and
the glass composition is 1 to 3 wt % for the $BaTiO_3$ powders.

3. The paste composition for an inner electrode for a multilayer ceramic capacitor according to claim 1, further comprising:
at least any one of rare earth elements of Y, Dy, Ho, and Yb; and Mg.

4. The paste composition for an inner electrode for a multilayer ceramic capacitor according to claim 1, wherein the glass composition is spherical particulate powders having an average grain size of 300 nm or less.

5. The paste composition for an inner electrode for a multilayer ceramic capacitor according to claim 1, wherein the softening point of the glass composition is 750 to 760° C.

6. The paste composition for an inner electrode for a multilayer ceramic capacitor according to claim 1, wherein the melting point of the glass composition is 950° C. or more.

7. The paste composition for an inner electrode for a multilayer ceramic capacitor according to claim 1, wherein the average grain size of the $BaTiO_3$ powders is ⅙ to ½ as compared to that of the conductive particle.

* * * * *